July 11, 1967  C. M. HOLLENBECK  3,330,669
SMOKE FLAVORING PROCESS
Filed March 27, 1964  2 Sheets-Sheet 2
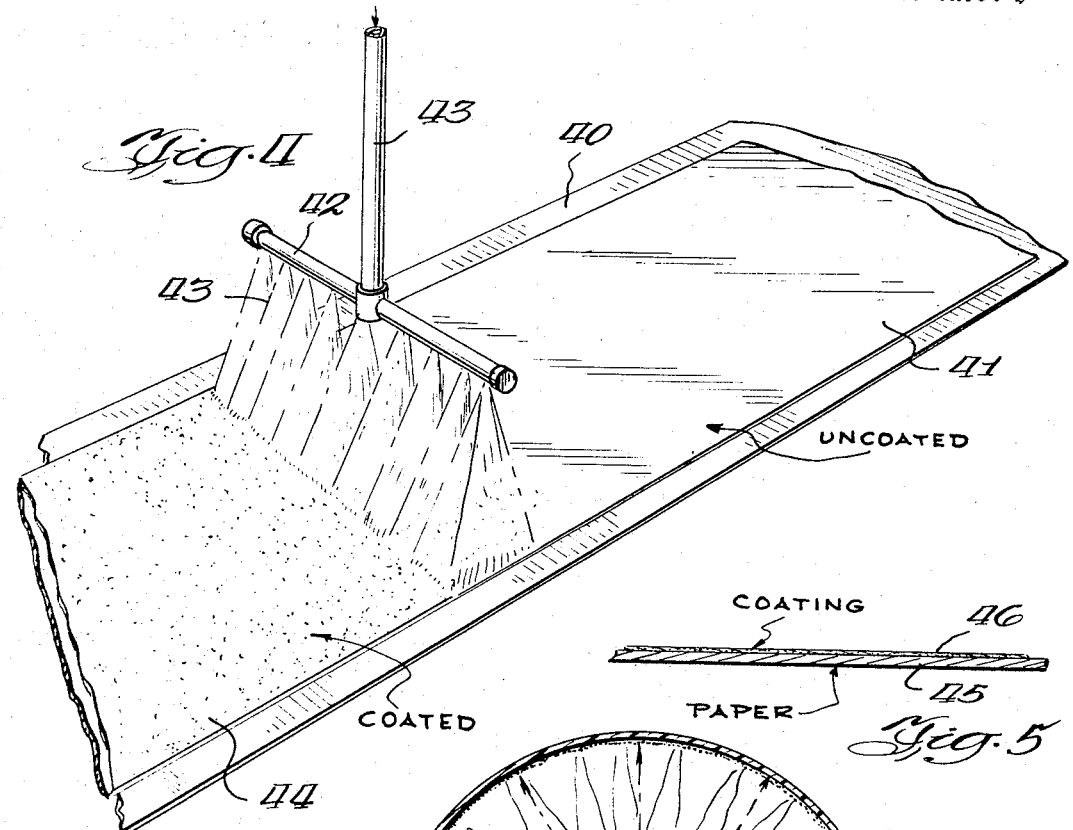
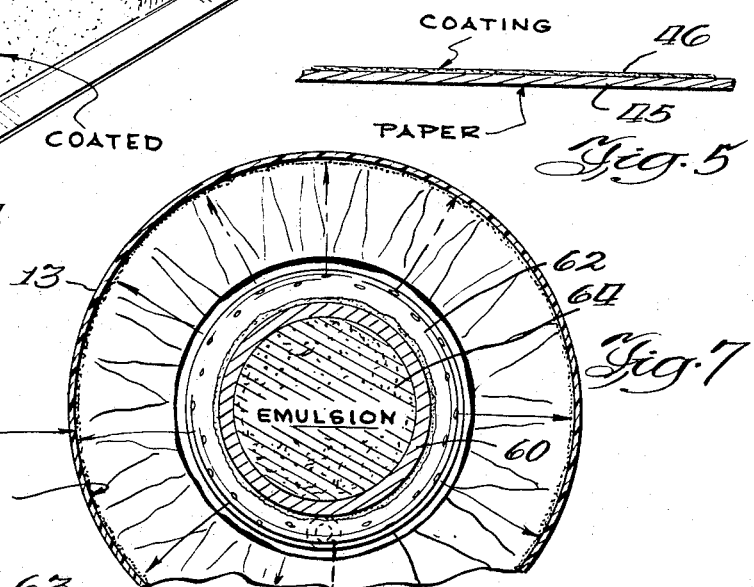
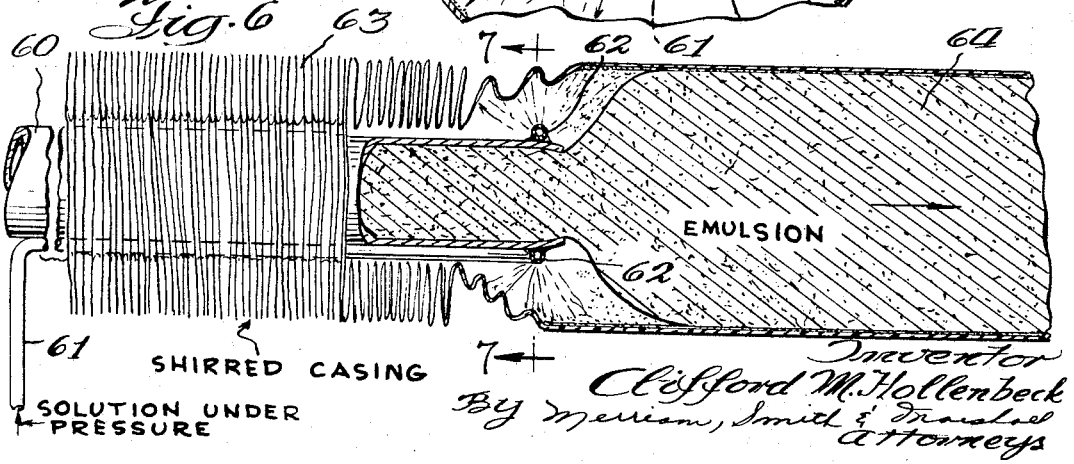
Inventor
Clifford M. Hollenbeck
By Merriam, Smith & Marshall
Attorneys

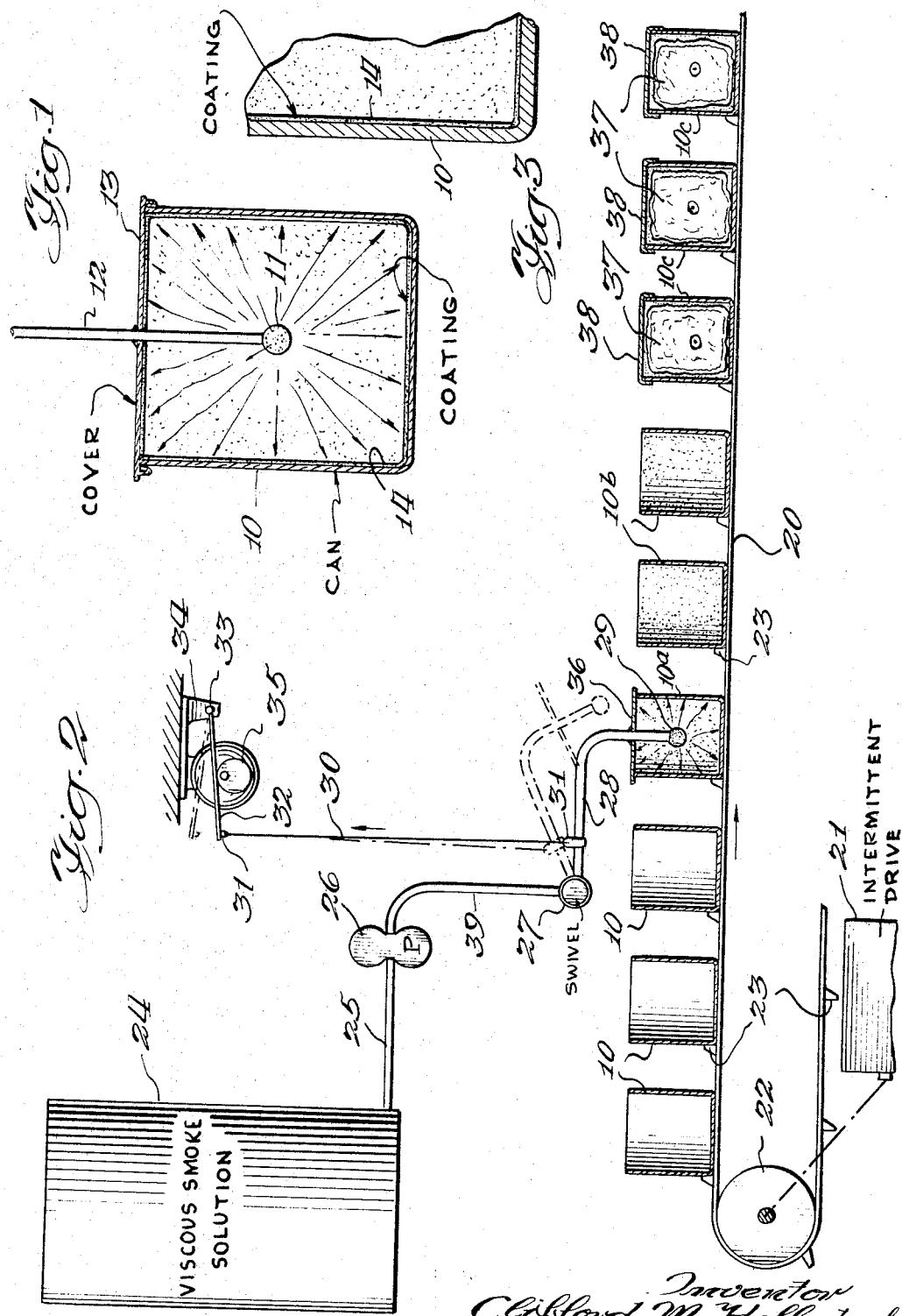

United States Patent Office 3,330,669
Patented July 11, 1967

3,330,669
SMOKE FLAVORING PROCESS
Clifford M. Hollenbeck, Manitowoc, Wis., assignor to Wisconsin-Zinn Malting Corporation, Manitowoc, Wis., a corporation of Wisconsin
Filed Mar. 27, 1964, Ser. No. 355,166
3 Claims. (Cl. 99—166)

This invention relates to the production of food products. More particularly, this invention is concerned with improved smoked and packaged food materials and processes for producing the same.

From time immemorial man has preserved food products by smoking. Various vegetable materials, such as wood and the like have been used for the production of the smoke. Not only does the smoke preserve foods, but also, particularly with meat, reactions take place between the smoke and the protein of the meat and the resulting product becomes very flavorsome and tasty with the very satisfying aroma of the smoke contributing a prized character to the product.

In the past, the smoking of food products has been accompilshed by subjecting the food product to actual contact with the smoke in a gaseous or cloud-like form, usually with such heat as was developed in the smoke creating operation. Such a smoking process, however, has long been considered unsatisfactory due to its inefficiency and variation in effectiveness of the smoking operation. Quite often some products are smoked too long and too strongly while others are too mildly treated. Furthermore, the loss in product due to excessive evaporation and rendering during the hot smoking process is often substantial and, therefore, processes which avoid such waste are clearly more economical and suitable for commercial operations.

Because of the shortcomings of smoking employing direct contact between gaseous smoke and the food product, including the difficulties of automating the smoking process and of controlling the level of smoke flavor added to the food, the trend has been to supply food processors with a liquid aqueous solution of smoke flavors. Smoke solutions of various types are disclosed in the art although a product of this type having superior properties is disclosed in U.S. Patent 3,106,473, issued Oct. 8, 1963. Such liquid smoke solutions are suitable for treating food products of a wide variety, including meats of all types, cheeses, and various cereal products, for human consumption.

One method of application of liquid smoke solution to meat products, such as canned hams and the like is by actually dipping the meat into the solution, or spraying the meat with the solution, letting the meat drain and then placing the treated meat in a suitable semi-finished container such as a can made out of metallic sheet-stock material i.e. a tin can with the lid or top unsealed. Subsequent to placing the meat in the can, the lid is sealed in place to make an air and water tight seal and the product then heated to pasteurize the meat, and at least sufficient to induce the smoke to penetrate to some extent into the body of the meat. In some cases the heat applied is sufficient to actually completely cook the canned meat product.

The actual operation of a smoking and packaging process as described is unsatisfactory at least because the operation requires considerable space on the canning line and necessitates the handling of the wet smoke flavored treated meat. Furthermore, dipping and handling of the wet meat product treated with smoke solution leads at times, undesirably, to staining of the operator's skin and considerable absorption of the smoke flavors onto the clothes and person of the operator.

To solve the problem of handling the wet food product and to reduce the space required, actual spraying of the solution into the container, before or after the food product is packed, has been employed. Direct spraying of the aqueous smoke solution into the empty can minimizes the space and personnel problems but it has been found that because of the very fluid condition of the solution it settles quickly to the bottom of the container. In such a case, and also when the food product is inserted into the container prior to the addition of the smoke flavoring, the tendency has been for the product to be smoke flavored properly only at the surface contacting the smoke solution. The tight fit of the food product in the container prevents the smoke vapors from circulating adequately throughout the internal area of the container during the cooking operation. In addition, the smoke flavors are absorbed by the meat and quickly react with the protein of the meat, upon heating, to become fixed thereto and unavailable for distribution further through the container and meat product.

Although the problem just recited has to do with smoke products in metallic containers, the smoke flavoring of other food products, such as sausage in casings, with liquid solutions has also presented some difficulties. The actual inclusion of the liquid smoke into such products can be effected before the product is placed in a shape-retaining skin or membrane, but to obtain desirable surface denaturation and color effects, it is more advisable if the smoke flavors are applied to the surface of the food product simulating the surface reactions and effects occurring when the meat product is hung in a smoke cloud.

Since the historical method of imparting smoke flavor to foods has been application at the food surface by a cloud of smoke, the consumer expects the smoke color and physical effects to be on the surface of the food. Furthermore, the consumer expects the greater intensity of smoke flavor to be at the food surface.

There is provided according to one aspect of the subject invention an improved process for smoke flavoring and packaging food products which comprises applying a layer of a viscous aqueous smoke solution to a surface of a food container-material and encasing a smokable food product in such container-material with the layer containing the smoke solution being adjacent the food product. In this way, the liquid smoke solution layer is placed in substantial contact with nearly the entire outer surface of the food product so that it can penetrate from the exterior to the inside of the food product from all directions. The result is that the product becomes uniformly smoke flavored and the major smoke effect is at the surface of the food similar to products hung in a smoke house.

The process is applicable to the preparation of finished food products packaged in both rigid, semi-rigid and flexible container-materials including containers, casings and sheet-stock wrapping material. The process is equally applicable to coating the interior surfaces of semi-finished containers, such as of sheet metal as well as the coating of a surface of a sheet-stock material of metal, plastic, cloth, paper or other material, including animal membrane material, used in the covering of sausages, cheeses and other edible food products. Also, the process is highly suitable for use where the container material, and the enclosed food product, are essentially impermeable to air and water.

According to additional aspects of this invention there are also provided novel food products, and novel food packing materials for applying smoke flavors and taste to foods.

By significantly increasing the viscosity of the aqueous liquid smoke flavored solutions it can be applied in a layer, usually of uniform application, which adheres and clings to the surface of the container-material. When it encases the food product, the smoke layer is placed into intimate and transferable contact with the food substance. The increased viscosity of the liquid smoke solution prevents it from flowing down vertical surfaces of containers and to the bottom thereof prior to the incorporation of a food substance in the container or the encasing of a food product with the container-material, such as when it is in the form of a wrapping material or sausage casing.

The invention is further illustrated by the attached drawings in which:

FIG. 1 is a sectional elevational view of a can showing means for applying a viscous smoke solution coating to its interior;

FIG. 2 is a schematic arrangement of apparatus for use in semi-automtically coating the interior of cans with a viscous smoke solution;

FIG. 3 is an enlarged cut-away section showing a smoke solution coating applied to the inside surface of a container;

FIG. 4 is a isometric drawing showing apparatus for applying a viscous smoke solution to sheet-stock material;

FIG. 5 is a sectional view of sheet-stock material coated with a viscous smoke solution;

FIG. 6 is a partially cut-away sectional view of a shirred casing on a stuffing horn being filled with an edible food material just after the interior of the casing has been sprayed with a viscous smoke solution; and FIG. 7 is a sectional view along the line 7—7 of FIG. 6.

A viscous liquid smoke solution can be applied to the internal surfaces of containers, such as cans, by a hand operation or advisably by an automatic system in which the solution is sprayed on the interior surfaces of the sides and bottom of the can, and if desired, the inside surface of the top or cover as well before it is sealed in place. The can then can be filled with the food product, such as a pork meat, particularly a ham, or other product, and the top or lid sealed in place to keep out air and water. Then the resulting canned product can be heated to the extent needed to cause the smoke flavor and the meat to react and the protein to be denatured and the smoke flavors fixed thereto in the same manner as the heat causes the reaction between gaseous smoke and meat hanging in a smoke house. In addition the heating operation can be at such a temperature so as to thoroughly cook the food product in those cases where cooking is necessary or desirable.

As shown in FIG. 1 of the attached drawings, can or container 10 is coated on its inside surface by positioning nozzle 11 approximately centrally therein and feeding a viscous smoke solution by means of pipe 12 from a suitable reservoir into nozzle 11, advisably under pressure so that it can be distributed from the nozzle in a plurality of fine streams to form a spray that will evenly apply the smoke solution to the inside of the container. During the coating of the interior of can 10, a cover 13 is advisably removably positioned at the top or mouth of the can so as to prevent the smoke solution from spraying out of the can. The cover 13 can be a removable cover used solely for the coating operation or it can be, in fact, the actual cover used subsequently to seal the can after it is filled with a food product.

FIG. 3 is an enlarged sectional view of can body 10 coated with a viscous liquid smoke solution 14 which adheres to the container surface and resists flowing to the bottom of the container.

Spraying an empty container requires much less equipment and space than equipment for dipping or spraying the food product itself. A can sprayer need be only a simple device which fogs, or atomizes the thickened smoke solution in measured quantities when inserted into an empty can. The thickened smoke solution can be sprayed on the inner can surfaces in a separate operation, well ahead of time of use. In fact, the thickened smoke solution can be dried on the inner surfaces and the cans stored, or otherwise held for a period of time prior to their use in a canning operation.

A mechanized arrangement for coating the inside of containers with a viscous smoke solution for subsequent use in preserving foodstuffs by packing the same in the coated containers followed by sealing thereof, is shown in FIG. 2. A movable supported belt 20 is driven intermittently by means 21 which is operably connected to roll drive means 22. The belt 20 is provided with spaced apart lugs 23 which propel containers 10 in spaced apart position on the upper surface of the belt 20. Tank 24 contains a viscous liquid smoke solution fed by pipe 25 to proportioning pump 26, then to pipe 39 and through swivel connection 27 into movable pipe 28 which communicates with nozzle 29. Pipe 28 is reciprocally movable by wire 30 which is attached to clamp 31 on pipe 28, and to clamp 31 on lever 32 which is pivotally connected at point 33 to a support 34. The lever arm 32 rides on cam 35 and raises it up and down which, by means of wire 30, causes arm 28 to be displaced up and down at the same time. Nozzle 29 is provided with a plurality of openings so that liquid smoke solution forced through it under pressure is emitted as a fine spray that coats the interior of each can into which it is placed. Thus, can 10a is being coated inside with viscous smoke solution. Temporary cover 36 is placed over the top of the can 10a to prevent the sprayed smoke solution from coming out of the can. After the inside of a can has been sprayed as described, pipe 28 is raised by means of the cam arrangement as described, the belt 20 is then moved intermittently so as to position the next can 10 in the place previously occupied by can 10a and the pipe 28 lowered to place nozzle 29 inside the can so that it is coated as described. Already coated cans 10b are shown support by belt 20. Cans 10c have been coated inside with the liquid smoke solution as described and have been filled with a foodstuff such as meat 37 followed by hermetic sealing of the so-filled cans by means of lids 38. The filled and sealed cans are then ready to be conveyed to appropriate cooking means where the food product is cooked and the liquid smoke solution released in the can to flavor the food product.

The viscous smoke solution can also be used to coat the surfaces of various sheet materials used to encase or wrap food products in various shapes, and particularly more or less tubular shapes for meats, particularly sausages, cheeses and the like. Such wrapping materials can be coated on one or more surfaces regardless of the shape in which the food products are ultimately formed.

The process of this invention is also highly applicable to those processing operations which utilize a roll of sheet-stock material, as the basic wrapping material, which is unwound and then formed into a longitudinal tube by wrapping the edges around until they abut or overlap each other for sealing together. Such sheet-stock material can be coated with the viscous smoke solution by spraying or other suitable means prior to, during or after the tube forming step, after which the food product can be encased in the so-coated sheet-stock material with the smoke coated layer placed in contact with or adjacent, the food substance.

FIG. 4 shows the application of a liquid viscous smoke solution to a sheet-stock material. As shown therein, support plate 40 is provided and over it moves sheet-stock material 41 which can be of various materials, such as paper, plastic film or cloth. As the sheet-stock material 41 moves along, it passes under spray arm 42 from which a fine spray of liquid smoke solution 43 is projected downwardly onto the sheet-stock material at such a rate as to apply a uniform coating thereon. The spray arm 42 is fed a liquid smoke solution under pressure by means of pipe 43. The sheet-stock material 41 having smoke solution coating 44 applied thereon, can then be used immediately for the packing of foodstuffs or alternatively, it can be dried for subsequent use.

Instead of spraying the smoke solution on, it can be applied by transfer from a suitable rotating roll to which the liquid solution is applied such as by being partially submerged in a tank. Also, the sheet-stock material can be dipped in the smoke solution and used immediately to wrap a food product, or it can be dried for later use.

FIG. 5 shows in somewhat enlarged sectional view a sheet-stock material of paper 45 on which has been applied an aqueous viscous liquid smoke solution 46.

Sausage casings, for example, can be spray coated with a viscous smoke solution prior to use or at the same time as stuffing with a device comprising a feeder tube and ring nozzles at the filling horn of the stuffer, allowing the casing to be sprayed in a zone just ahead of the stuffed meat emulsion.

FIGS. 6 and 7 show apparatus and means for applying a viscous smoke solution to the interior of a food casing just prior to filling the casing with a food product, such as sausage meat emulsion for frankfurters. A sausage horn 60, which is of tubular section, is provided with a pipe 61 for feeding liquid smoke solution to a ring-type nozzle 62. The ring nozzle 62 is positioned on the exterior surface of the sausage horn near the end thereof and is provided with a plurality of openings so that the liquid smoke solution can be sprayed therefrom in a uniform spray or mist. The pipe 61 is placed approximately in contact with the exterior surface of the sausage horn so as not to obstruct the implacement of a shirred casing 63 thereon. The shirred casing 63 is positioned in a more or less accordion fashion. As the casing 63 is filled, such as with a sausage emulsion 64, the casing is expanded or extended to the right and is more or less unraveled from the shirred state as it is filled. Just prior to having the meat emulsion 64 contact the interior of the sausage casing, an aqueous smoke solution is sprayed through nozzle 62 onto the sausage casing so that as the emulsion fills the casing the smoke solution forms a coating in contact with the exterior surface of the sausage. The rate of spray of the smoke solution through nozzle 62 is of course adjusted according to the rate at which the sausage casing is stuffed with the sausage emulsion. After the casing has been entirely filled with the sausage emulsion, the spray is turnd off, a new shirred casing is positioned on the horn and the operation is repeated. If desired the outside surface of a casing can be coated with the viscous smoke solution such as by spraying or dipping and turned inside out with or without prior drying. It can be dried after being turned inside out. The casing can be filled with a food-stuff at any time after being turned inside out so as to place the coating of smoke on the inside and in contact with the foodstuff.

The viscous liquid smoke solutions of this invention include solutions produced by incorporating at least a small amount of a thickening agent in an aqueous smoke solution, and also include smoke solutions formed by incorporating an aqueous smoke solution in an already viscous carrier such as a sugar syrup or an edible fat or oil such as lard oil, corn oil or cottonseed oil, or which increases in viscosity when the materials are combined such as by the formation of an emulsion.

A variety of viscosity increasing edible materials can be used to thicken a liquid smoke flavored solution. Thickening or viscosity increasing agents from synthesis, vegetable and animal sources can be employed. Furthermore, under certain circumstances it is feasible to employ various inorganic materials which have the capacity to form colloidal dispersions which thicken or increase the viscosity of the smoke solutions.

Included within the thickening agents that are useful in practicing this invention are gum, guar, methyl cellulose, acid solution gelling carboxy methyl celluloses, and other carbohydrate-like gum materials. Additional gel forming agents which can be used are those of the protein type, such as gelatin. Gelatin, however, is a weak gelling agent under acidic conditions. Because the liquid smoke solutions are generally acid it is advisable to employ a buffering material such as the glassy phosphates, such as sodium hexametaphosphate, in the smoke solution to improve the gelling character of gelatin. Other thickening materials which can be used are carbohydrate products such as Irish moss, locust beam gum, dextran, glucomer, agar, and seaweed extractives. Some starches can also be used to increase the viscosity, although generally it is advisable to employ them with a buffering agent, particularly a phosphate suitable for use in edible products, and in some cases to heat the suspension to obtain a smooth gel. Sugars, such as dextrose and sucrose, and other soluble compounds, can also be used providing they are sufficiently soluble in the smoke solution to form a viscous solution.

Also certain edible fats and oils, such as lard or vegetable oils, can be emulsified with the smoke solution to form a viscous emulsion which serves the purpose of this invention.

The amount of viscosity increasing substance used in the aqueous liquid smoke flavored solution is not narrowly critical but is related to the thickening means, the container-material and its surface condition, the size of the container, the type of applying means, the amount of smoke solution needed and the rate of application. It should be thickened enough though so that an applied layer of the smoke solution is uniform and remains substantially in place until the sheet-stock wrapping of container-material or container is packed with a foodstuff.

Generally, only a small amount of thickening agent is used and this generally need not comprise more than about 5% by weight of the aqueous thickened product, except in the case of agents such as sugars and fats when the amounts of thickening agent actually may be in greater proportion than the unthickened smoke solution used. The more active gelling agents can be employed in considerably lower concentrations. Generally not more than 1 or 2% by weight of the usual viscosity increasing agents need be employed in the thickened liquid smoke solution. Usually, however, at least 0.25% of the thickening agent is employed to attain a viscosity needed for adequate adherence of the material to the wrapping or container-material or container surface.

The thickening agents which are most suitable for use in this invention are those that are easily suspended in a cold or cool aqueous smoke solution and which increase the viscosity of the smoke solution without any special procedure, such as heating, in order to effect their dispersion or dissolution in the smoke solution.

By packaging food products in the manner described, products are obtained having taste and flavor characteristics at least comparable, and generally superior, to similar products which are smoked in a cloud of smoke.

The amount of smoke solution applied as a layer to the wrapping or container-material or container surface will vary according to the extent of flavor and aroma desired in the final product, and the flavor potency of the smoke solution. For example, a smoke solution with about 6% total acidity as acetic acid can be employed at the rate of about one to ten ounces, with about 5 ounces of thickened aqueous smoke solution being about average, per 100 pounds of most food products, such as meats. This is about 1.4 gms. of thickened smoke solution per 1 pound of food product.

The following examples are presented to illustrate the invention:

*Example 1*

1.5% by weight of the methyl ether of cellulose (Methocel) was added to a liquid smoke solution at 67° F. with stirring. The methyl cellulose was allowed to gel for about 30–60 minutes. The thickened aqueous smoke solution was then sprayed on the inner surface of an empty 1 pound can at the rate of 5 ounces of solution per 100 lbs. of meat (1.4 g. for the 1 pound can). Chopped beef was pressed tightly into the can, the can sealed and cooked in an autoclave at 240° F. for 35 minutes. The cooked meat was cooled, sliced, and evaluated for "smokiness" in flavor. The smoke solution smoke flavor penetrated well, and evenly, into the meat mass, and the flavor of even the inner slices was a pleasant smokiness.

*Example 2*

The same procedure as in Example 1 was used, except that 1.5% of gum guar was used as the thickening agent. The smoke flavored meat was equally good in smoky flavor as in Example 1.

*Example 3*

The same type of experiment as described in Example 1 was performed using 3% gelatin in an aqueous smoke solution which had 1% sodium hexametaphosphate added to it to improve the gelling properties of the gelatin. This thickened smoke solution worked satisfactorily, but not as smooth a coating was made in the inner surface of the can as in Examples 1 and 2. The flavor of the meat product, however, was satisfactory.

*Example 4*

A pre-gelled starch was used as the thickening agent in an aqueous smoke flavored solution containing 1% sodium hexametaphosphate. The viscous solution was used as in Example 1. This thickened smoke solution worked well.

*Example 5*

1.5% gum guar in aqueous smoke solution prepared similarly to Example 2 was used for spraying 3 lb. cans similar to those used in a regular ham canning line. The boneless cured ham meat was pressed into the can and the canned product heat processed in the usual way. The smoke flavor penetrated the ham, and the finished product tasted very similar to a regular smoked canned ham.

*Example 6*

A regular synthetic sausage casing was soaked in warm water to make it more pliable, and thereafter filled with a thickened solution comprising 1% gum guar in an aqueous smoke solution. The casing was then drained, leaving a uniform coating of smoke solution on the inner surface. The casing was stuffed with sausage emulsion from a commercial sausage process and tied into links. The linked sausage was heat processed at 105° F. for 3 hours, and 175-185° F. for 2 hours. The links were cooked in boiling water for about 15 minutes, cooled in cold water, and the casing removed by peeling. The finished, cooked sausage links showed an acceptable surface color, and a good smoky flavor.

*Example 7*

A procedure similar to that described in Example 6 was followed except that a large synthetic casing was used, made from a vegetable-base film, resistant to boiling. The casing (about 3 inches in diameter and 7 inches long, sealed at one end) was coated with thickened smoke solution, drained to leave a uniform film of smoke solution on the inner surface, stuffed with sausage emulsion, and tied to close the open end. The bag of emulsion was heat processed as in Example 6, cooked, and removed from the bag. The external color of the cooked sausage was good, and the smoky flavor penetrated into the mass of meat.

*Example 8*

Regular cheese cloth was dipped in thickened smoke solution (1% of gum guar in smoke solution), squeezed until it was semi-dry, then used to wrap quarter pound blocks of cheddar cheese. The wrapped cheese was held for 24 hours at about 70° F. and examined for smoke flavor penetration. The surface of the cheese blocks developed the brown color of smoked cheese, and the smoke flavor penetrated well into the inner areas of the block.

*Example 9*

A sheet of synthetic food film (Saran) was sprayed with a thin layer of thickened smoke solution in a uniform manner and the thickened smoke coated film was then dried by a moving current of air. The dried, coated film was used then to wrap pieces of cheddar cheese, coated side next to the cheese, and the wrapped cheese held for 24 hours at 70° F. The smoke flavor penetrated well into the cheese giving it the appearance and flavor of regular smoked cheese.

The smoke solution contained 1% of gum guar.

*Example 10*

A thickened smoke solution was sprayed evenly over the inner surface of a metal container. The smoke solution film was dried with a current of warm air, and the container stored for later use. The film coated container was used to cook a chopped meat product, and the cooked, cooled meat possessed a smoky surface appearance, and a good smoky flavor.

The smoke solution contained 1% of gum guar.

*Example 11*

Eighteen grams of lard and two milliliters of smoke solution were vigorously stirred to disperse the smoke solution into a cream-like emulsion. Fourteen grams of the resulting emulsion was spread evenly on the inner surface of a metal can. The can was packed with ground beef, sealed, and cooked in a dry oven at 400° F. for 60 minutes. The cooked, canned meat was cooled and sliced for flavor evaluation. The external surface of the meat was darkened with smoke color, and the meat itself possessed a desirable "smokiness."

*Example 12*

Two milliliters of smoke solution were added to eighteen milliliters of thick clear sugar syrup (about 75% solids). A fourteen gram portion of the thickened, syrupy smoke solution was used to coat the inner surfaces of a metal container. Chopped beef was packed and cooked in the container in a manner similar to Example 11. The meat developed a suitable external smoky color, and a good smoky flavor.

Various changes and modifications of the invention can be made and, to the extent that such variations incorporate the spirit of this invention, they are intended to be included within the scope of the appended claims.

What is claimed is:

1. The process of improving the smoke flavoring and packaging of food products which comprises combining a gel forming edible viscosity increasing substance with an aqueous solution of smoke flavor in sufficient amount to produce a fluid with reduced flow which clings to a surface of a food or container-material, and applying a layer of the viscous solution to a surface of a food or food container-material.

2. The process of claim 1 in which the food product is a meat food.

3. The process of claim 1 in which the food product is a cheese food.

References Cited

UNITED STATES PATENTS

| | | | |
|---|---|---|---|
| 1,484,523 | 2/1924 | Mumm et al. | 99—175 |
| 1,883,657 | 10/1932 | Ettlinger | 99—176 |
| 2,316,804 | 4/1943 | Musher. | |
| 2,346,232 | 4/1944 | Piret | 99—208 |
| 2,722,482 | 11/1955 | Betts. | |
| 2,896,254 | 7/1959 | Braun. | |
| 3,106,473 | 10/1963 | Hollenbeck | 99—229 |
| 3,152,914 | 10/1964 | Taylor | 99—229 X |

FOREIGN PATENTS 589,274  6/1947  Great Britain.

A. LOUIS MONACELL, *Primary Examiner.*

HYMAN LORD, *Examiner.*